(12) United States Patent
Prokopchik (10) Patent No.: US 11,320,020 B2
(45) Date of Patent: May 3, 2022

(54) FRICTION SHOCK ABSORBER

(71) Applicant: Aleh Nicolaevich Halavach, Minsk (BY)

(72) Inventor: Andrey Prokopchik, Bobruisk (BY)

( * ) Notice: Subject to any disclaimer, the term of this patent is extended or adjusted under 35 U.S.C. 154(b) by 0 days.

(21) Appl. No.: 16/624,360

(22) PCT Filed: Apr. 5, 2018

(86) PCT No.: PCT/BY2018/000007
§ 371 (c)(1),
(2) Date: Dec. 19, 2019

(87) PCT Pub. No.: WO2018/232485
PCT Pub. Date: Dec. 27, 2018

(65) Prior Publication Data
US 2021/0231189 A1 Jul. 29, 2021

(30) Foreign Application Priority Data
Jun. 21, 2017 (EA) .............................. 2017/EA/0049

(51) Int. Cl.
*F16F 13/00* (2006.01)
*B61G 11/14* (2006.01)
*F16F 13/04* (2006.01)

(52) U.S. Cl.
CPC ............ *F16F 13/005* (2013.01); *B61G 11/14* (2013.01); *F16F 13/04* (2013.01); *F16F 2222/04* (2013.01);
(Continued)

(58) Field of Classification Search
CPC ......... B61G 11/14; B61G 9/10; F16F 13/005; F16F 7/08; F16F 7/09; F16F 7/095
See application file for complete search history.

(56) References Cited

U.S. PATENT DOCUMENTS 1,632,915 A 6/1927 O'Connor
1,633,034 A 6/1927 O'Connor
(Continued)

FOREIGN PATENT DOCUMENTS

RU 2198809 2/2003
RU 2338100 11/2008
(Continued)

OTHER PUBLICATIONS

Written Opinion for PCT/BY2017/000006 dated Jul. 13, 2017, 5 pps.
(Continued)

*Primary Examiner* — Melanie Torres Williams
(74) *Attorney, Agent, or Firm* — Michael Downs; Downs IP Law LLC (57) ABSTRACT

The invention relates to the field of transport mechanical engineering and concerns friction shock absorbers for vehicles.
The object of the invention is to improve the operational life, performance and reliability of a friction shock absorber.
The friction shock absorber comprises housing (1) with bottom (2) and with orifice (3) formed by walls (4), internal surfaces (fv) whereof form alternating working beds (V1) and connecting beds (V2), and further comprises friction assembly (5) consisting of pressure wedge (6) and stay wedges (7) in contact with same, said stay wedges being provided with friction surfaces (fp), while return-and-retaining device (8) is located between bottom (2) and friction assembly (5). In addition, the area (S1) of contact between friction surfaces (fp) of stay wedges (7) and internal surfaces (fv) of walls (4) of orifice (3) in working beds (V1) exceeds the corresponding area (S2) of contact in the connecting beds (V2).
The internal surfaces (fv) may be straight, while the values of angles ($\theta1$) between adjacent internal surfaces (fv), which
(Continued)

form working beds (V1), are lower than the values of angles (θ2) between adjacent internal surfaces (fv), which form the connecting beds (V2).

The thickness of walls (4) of the orifice (3) is variable with an increase in the direction from the working bed (V1) to the connecting bed (V2).

The contact between pressure wedge (6) and stay wedges (7) is provided along linked curved surfaces (fκ).

7 Claims, 7 Drawing Sheets

(52) U.S. Cl.
CPC ....... *F16F 2230/04* (2013.01); *F16F 2232/08* (2013.01); *F16F 2236/045* (2013.01)

(56) References Cited

U.S. PATENT DOCUMENTS

| | | | |
|---|---|---|---|
| 1,670,478 A | | 5/1928 | O'Connor |
| 1,747,482 A | | 2/1930 | O'Connor |
| 1,765,876 A | | 6/1930 | O'Connor |
| 1,883,064 A | | 10/1932 | Stevens |
| 1,914,051 A | | 6/1933 | Sproul |
| 1,935,879 A | * | 11/1933 | Herndon .......... B61G 9/10 213/32 R |
| 2,207,288 A | * | 7/1940 | Cottrell .......... B61G 9/10 213/32 R |
| 2,257,306 A | * | 9/1941 | Olander .......... B61G 9/10 213/32 R |
| 2,281,270 A | * | 4/1942 | Cottrell .......... B61G 9/10 213/32 R |
| 2,588,703 A | * | 3/1952 | Cottrell .......... B61G 9/10 213/34 |
| 2,916,163 A | | 12/1959 | Campbell |
| 2,982,426 A | * | 5/1961 | Mulcahy .......... B61G 11/18 213/221 |
| 3,178,036 A | | 4/1965 | Cardwell |
| 3,255,892 A | | 6/1966 | Mulcahy |
| 4,076,129 A | | 2/1978 | Housman |
| 4,645,187 A | | 2/1987 | Kanjo et al. |
| 4,735,328 A | | 4/1988 | Carlstedt |
| 4,960,215 A | | 10/1990 | Carlstedt |
| 5,152,409 A | | 10/1992 | Sommerfeld |
| 7,419,065 B2 | | 9/2008 | Sommerfeld et al. |
| 8,672,151 B2 | | 3/2014 | Sprainis et al. |
| 2018/0355947 A1 | | 12/2018 | Halavach |
| 2019/0144016 A1 | | 5/2019 | Halavach |
| 2019/0301559 A1 | | 10/2019 | Halavach |

FOREIGN PATENT DOCUMENTS

| | | |
|---|---|---|
| RU | 2380257 | 1/2010 |
| RU | 157497 | 12/2015 |
| WO | WO/2017/143422 | 8/2017 |
| WO | WO/2018/023187 | 2/2018 |
| WO | WO/2018/064741 | 4/2018 |

OTHER PUBLICATIONS

International Search Report for PCT/BY2017/000006 dated Jul. 13, 2017, 1 pps.
Written Opinion for PCT/BY2017/000002 dated Aug. 14, 2017, 4 pps.
International Search Report for PCT/BY2017/000002 dated Aug. 14, 2017, 1 pps.
Written Opinion for PCT/BY2017/000003 dated Jul. 13, 2017, 4 pps.
International Search Report for PCT/BY2017/000003 dated Jul. 13, 2017, 1 pps.
Office Action for U.S. Appl. No. 15/779,728 dated Jan. 13, 2020; 8 pps.
Notice of Allowance for U.S. Appl. No. 16/310,421 dated Mar. 10, 2020; 8 pps.
Final Office Action for U.S. Appl. No. 15/779,728 dated Jun. 29, 2020; 10 pages.
Office Action for U.S. Appl. No. 16/339,165 dated Jul. 8, 2020; 11 pages.

* cited by examiner

Fig. 1

*Section A-A for Fig. 1*

*Fig. 2*

Section A-A for Fig. 1

*Fig . 6, View B*

*Fig . 7*

*Fig . 6, View C*

FRICTION SHOCK ABSORBER

The invention relates to the field of transport mechanical engineering and concerns primarily shock-absorbing devices for automatic couplers of cars of a railway train.

A prior art friction shock absorber is known, [1, Patent U.S. Pat. No. 6,478,173, IPC B61G9/10; B61G11/14; B61G9/18; B61G9/06, priority date Feb. 13, 2001, publication date Nov. 11, 2002], which comprises a housing with a bottom, whose walls form a hexagonal orifice, in which a friction assembly is located, such friction assembly consisting of a pressure wedge and stay wedges, which are in contact with said pressure wedge and the internal walls of the orifice, wherein a return-and-retaining device with a supporting plate is located between the friction assembly and the bottom. A centering bar goes through the return-and-retaining device and the pressure wedge of the friction assembly along the main axis.

This design of the friction shock absorber has sufficient power capacity, but tends to deteriorate during operation. This is due to the conditions under which the friction shock absorber operates with its main axis oriented horizontally, and with the shape of the orifice, the inner surfaces whereof form a regular hexagon in any section parallel to the bottom.

When the orifice has such a form, its walls have an equal thickness. When the shock absorber operates in horizontal position, it is additionally affected by the gravity force, which tends to shift the pressure wedge and the stay wedges away from the main axis towards the wall, on which the friction shock absorber, installed in the automatic coupling device of the car, rests. Due to this reason, some of the walls deteriorate more intensively than the other, and this not only leads to the rejection of the housing before expiration of than the required maintenance-free service life period according to the criteria of the residual wall thickness, but also affects its mechanical strength, since significant separating forces that occur during the operation of the shock absorber can break the orifice of the housing in points of excessive wear of some of its walls due to their thinning and concentration of stresses in these points.

These factors cause premature deterioration in performance and reduce the reliability of the prior art device. An increase in the thickness of all walls of the housing in order to compensate for such deterioration would lead to a decrease of the internal volume of the housing, which would prevent installation of a return-and-retaining device with sufficient power capacity.

Therefore, the object of the invention is to improve the operational life, performance and reliability of the friction shock absorber by achieving a technical goal that involves increase in the transmission coefficient of the friction shock absorber and compensation of uneven deterioration of the housing walls due the negative impact of gravity forces.

Said object is achieved by a friction shock absorber, comprising a housing with a bottom and with an orifice formed by walls, the internal surfaces whereof form alternating working beds and connecting beds, and further comprising a friction assembly consisting of a pressure wedge and stay wedges in contact with same, said stay wedges being provided with friction surfaces, adjacent to the internal surfaces of the walls of the orifice, while a return-and-retaining device is located between the bottom and the friction assembly, and having a characteristic feature: the area of contact between the friction surfaces of the stay wedges and the internal surfaces of the walls of the orifice in the working beds exceeds the corresponding area of contact in the connecting beds.

This characteristic feature allows increase of the transmission coefficient of the friction shock absorber and, accordingly, its power capacity, as well as redistribution of the separating forces along with the gravity forces in such a way that their impact on the housing orifice becomes uneven and directed towards their thicker zones formed by different shapes of working and connecting beds that are not uniform in shape. It allows effective compensation of the negative influence of gravity forces and to increase the reliability and service life of both the housing and the friction shock absorber as a whole.

Additional Characteristic Features of the Utility Model:

the internal surfaces of the walls, which form the working beds and the connecting beds, are straight and are located at an angle to each other.

the values of angles between adjacent internal surfaces, which form working beds, are lower than the values of angles between adjacent internal surfaces, which form the connecting beds;

the thickness of walls of the orifice is variable with an increase in the direction from the working bed to the connecting bed;

the return-and-retaining device is provided with a supporting plate in contact with the stay wedges;

hard lubricant inserts are available between the stay wedges and the walls of the orifice;

hitches are provided in the walls of the orifice on the connecting beds;

the contact between the pressure wedge and the stay wedges is provided along linked curved surfaces.

The utility model is further described in detail with reference to the accompanying figures, wherein.

Figure 6:
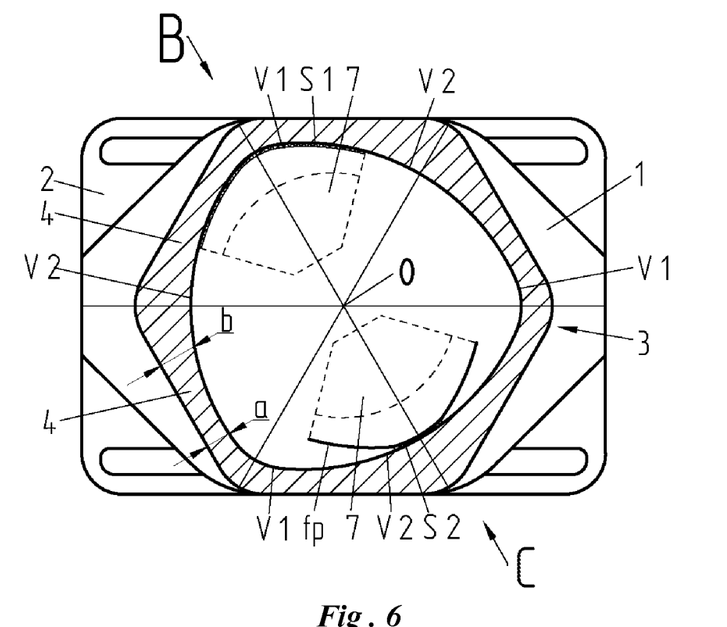
FIG. 6 shows the top view of an embodiment of the orifice of the housing of the friction shock absorber with a broken-out section view.
Figures 6, 7:
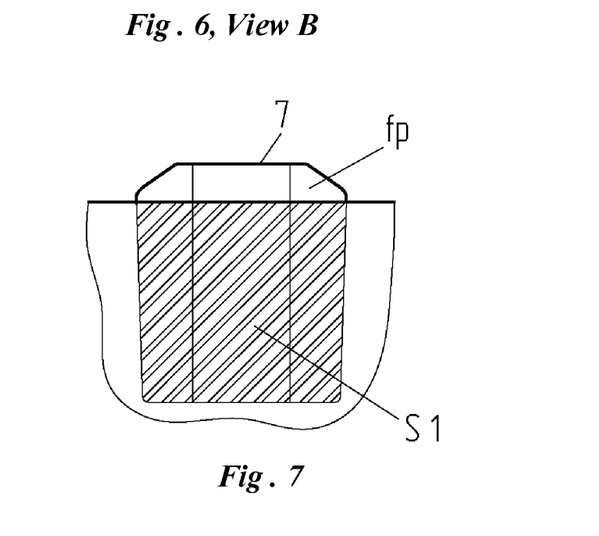
FIG. 7 shows view B of a stay wedge, installed in a working bed, according to FIG. 6.
Figures 6, 8:
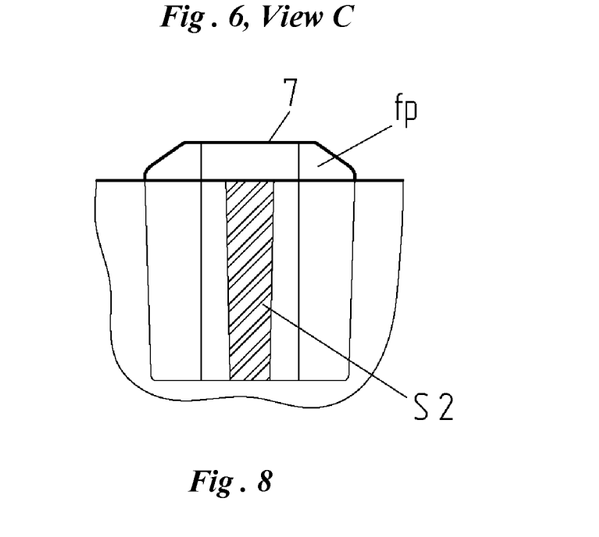
FIG. 8 shows view C of a stay wedge, installed in a connecting bed, according to FIG. 6.

The friction shock absorber (FIG. 1-3) comprises housing 1 with bottom 2 and with orifice 3 formed by walls 4, the internal surfaces fv whereof form alternating working beds V1 and connecting beds V2, and further comprises friction assembly 5 consisting of pressure wedge 6 and stay wedges 7 in contact with same. Said stay wedges 7 are provided with friction surfaces fp, while return-and-retaining device 8 is located between bottom 2 and friction assembly 5. The profile, the internal surfaces fv whereof form working beds V1 and connecting beds V2, is implemented in such a way, that the area S1 of contact between friction surfaces fp of stay wedges 7 and internal surfaces fv in working beds V1 exceeds (FIGS. 6, 7) the corresponding area S2 of contact in the connecting beds V2 (FIGS. 6, 8).

The return and retaining device 8 (conventionally shown by crossed straight lines in FIGS. 2 and 3) may be represented by compression springs, or it may be designed as a stack of resilient and elastic elements, similarly to the prior art shock absorber. Return-and-retaining device 8 is in contact with stay wedges 7 and may be provided with supporting plate 9 at the place of such contact.

Figure 2:
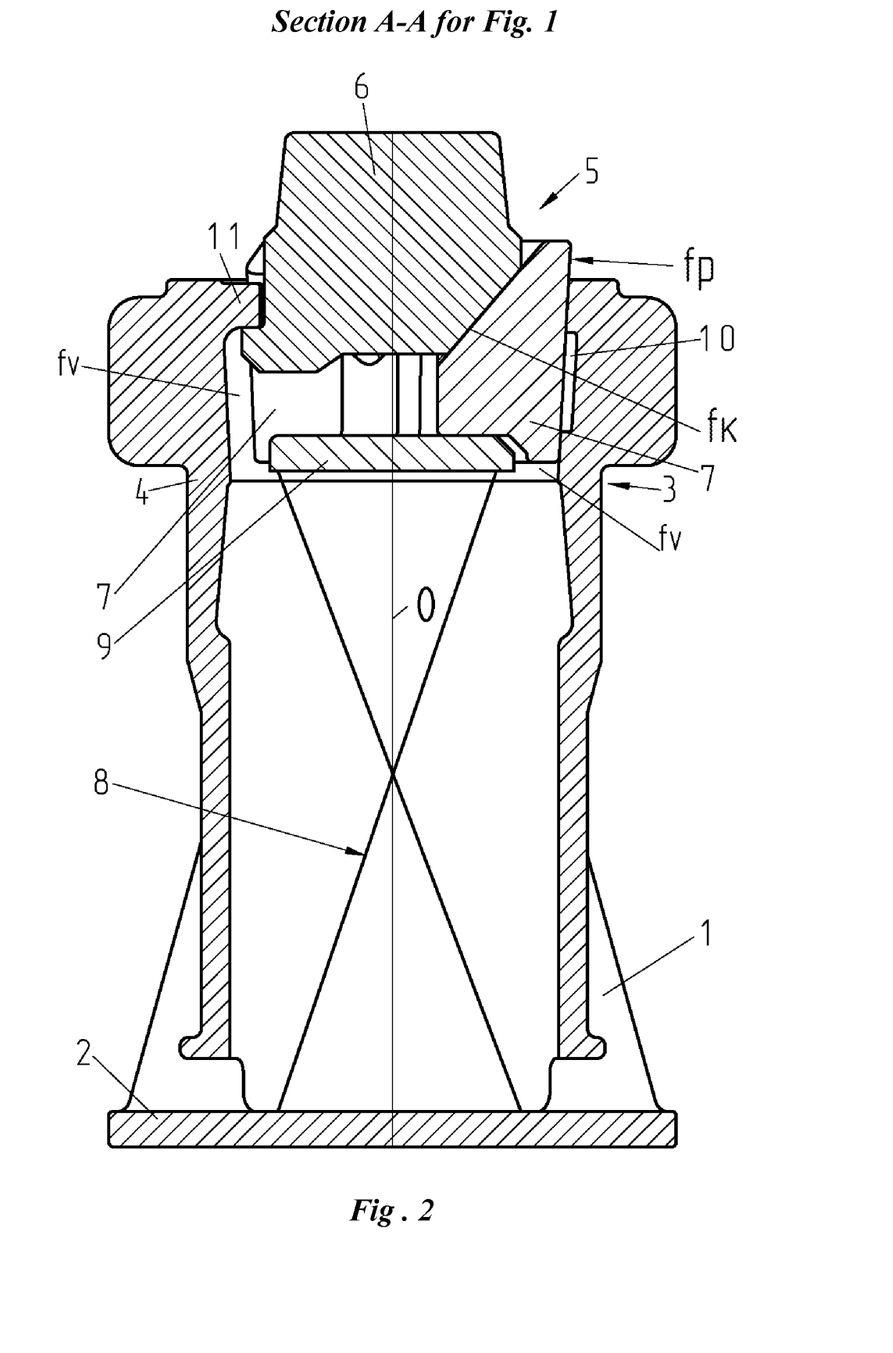
FIG. 2 shows a longitudinal section A-A according to FIG. 1, wherein the friction shock absorber is in the initial position.
Figure 3:
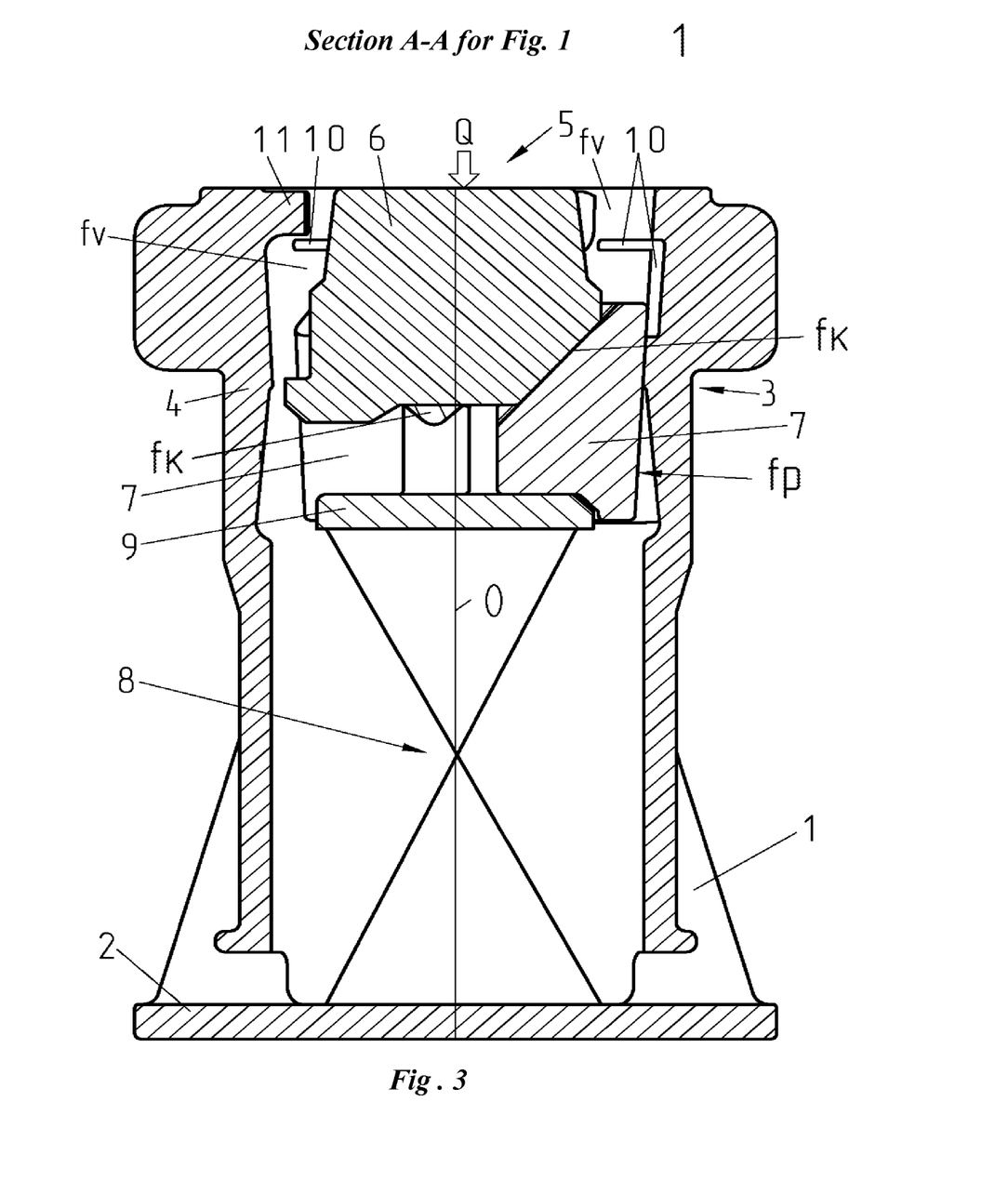
FIG. 3 shows a longitudinal section A-A according to FIG. 1, wherein the friction shock absorber is in fully compressed position.
Figure 4:
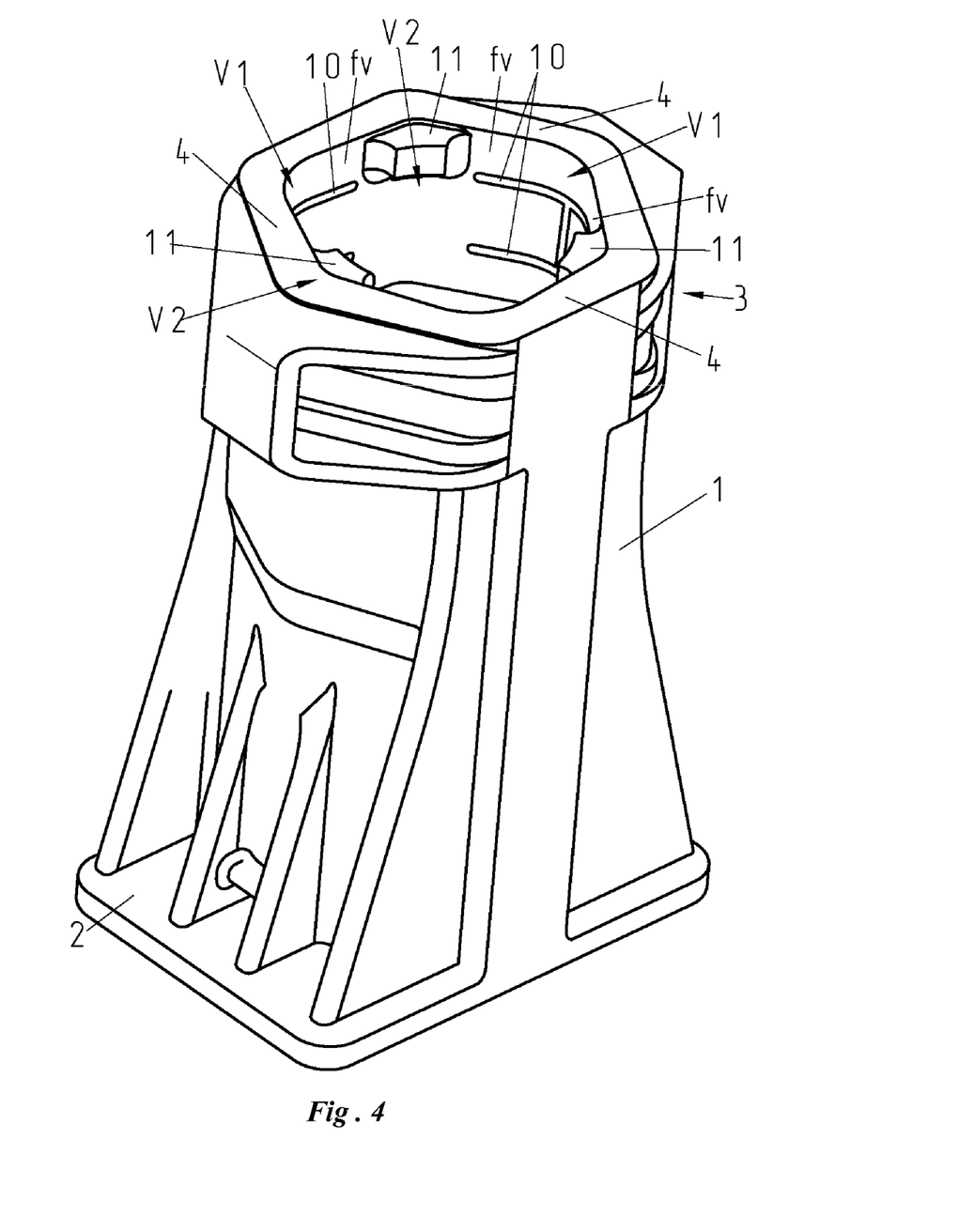
FIG. 4 shows isometric projection of the housing of the friction shock absorber.
Figure 5:
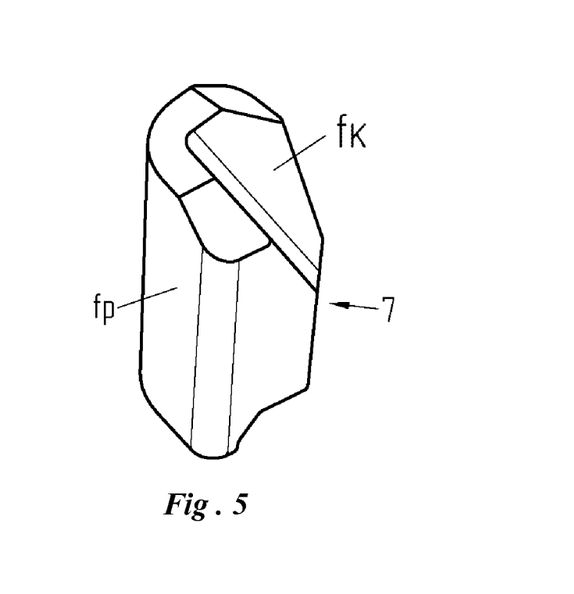
FIG. 5 shows a stay wedge of the friction assembly.

In order to reduce the rate of deterioration of walls 4 of orifice 3 of housing 1, and to increase operational stability of the friction shock absorber, it is advantageous to install hard lubricant inserts (10) between walls 4 and stay wedges 7 (FIG. 2-4).

Figure 9:
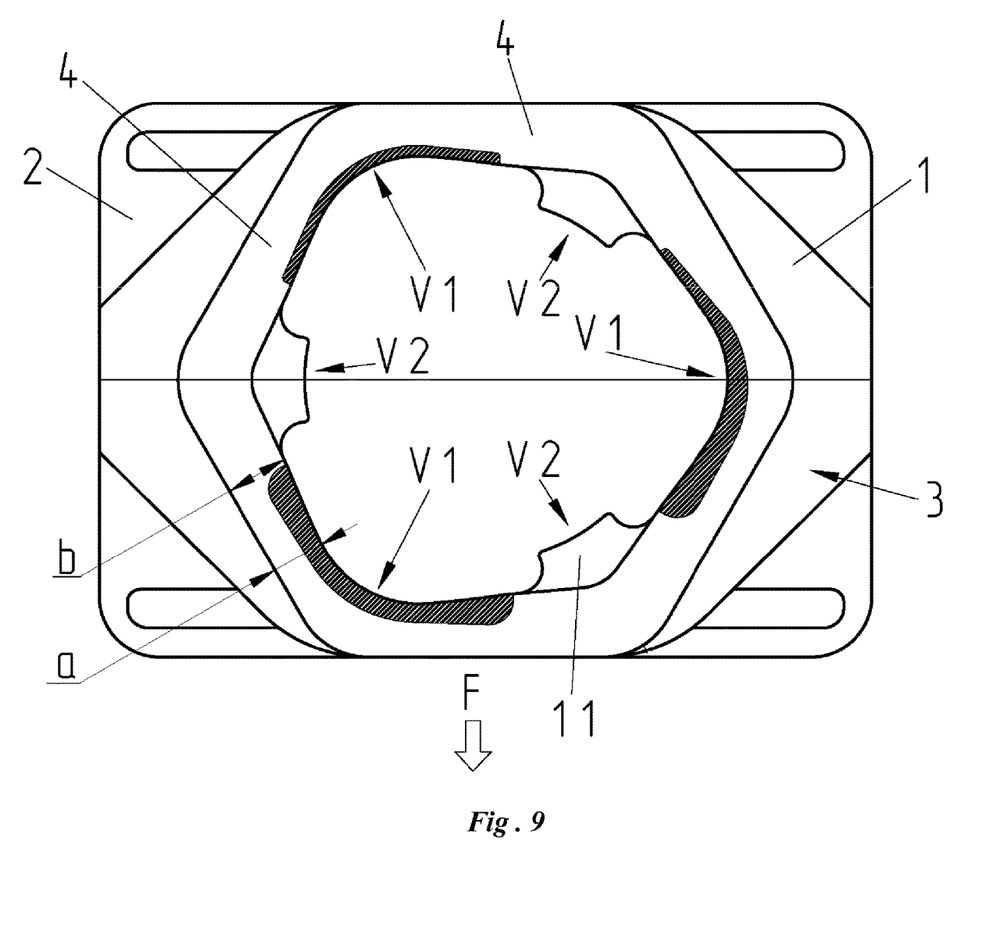
FIG. 9 shows the top view of a deteriorated housing of the friction shock absorber.

The different profiles of the working beds V1 and the connecting beds V2 result in variable thickness of walls 4. The lowest thickness is at the working beds V1, having the value of a (FIGS. 6,9), and it gradually increases in the direction of the connecting beds V2 till it reaches its greatest value b. Under the conditions of operation of the friction shock absorber with the horizontal main axis O, the deterioration of the walls 4 is uneven (FIG. 9) due to gravity forces F. A significant advantage over the prior art shock absorber is lower deterioration in the areas having thickness a and higher deterioration in the areas having thickness b. It means that the residual wall thickness tends to equalize over time and remains sufficient for the operational suitability of the shock absorber housing, which is not observed in the prior art.

Figure 1:
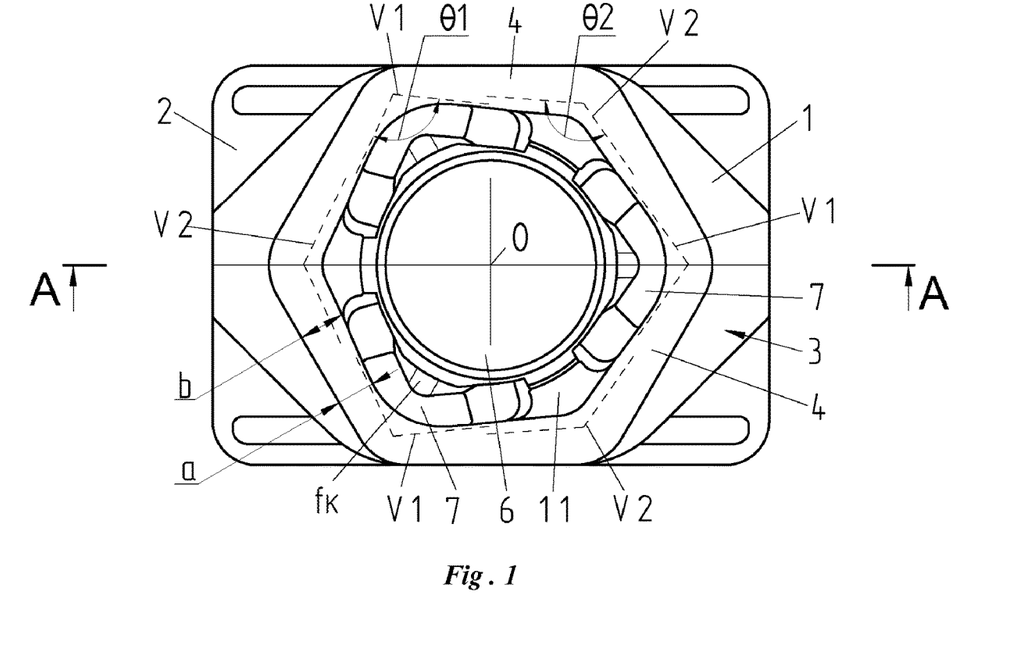
FIG. 1 shows the top view of the friction shock absorber according to the invention.

Different profiles of the working beds V1 and the connecting beds V2 provide for an increase in the transmission coefficient of the friction shock absorber, which directly leads to an increase in its power capacity. A more illustrative example of different profiles of working beds V1 and connecting beds V2 is an embodiment, wherein the internal surfaces fv of walls 4, which form said beds, are straight (FIG. 1). In this case, the values of angles θ1 between adjacent internal surfaces fv, which form working beds V1, are lower than the values of angles θ2 between adjacent internal surfaces fv, which form the connecting beds V2.

Uneven deterioration of the walls 4 due to gravity forces F (FIG. 9) and the displacement of the friction assembly in the direction of these forces may result in gaps occurring between at least one of the spacer wedges 7 and the pressure wedge 6, which can negatively affect friction shock absorber performance. Therefore, it is advantageous when the linked surfaces fк of contact between stay wedges 7 and pressure wedge 6 are curved, which will prevent the displacement of these parts relative to each other, and will increase the area of their mutual contact and the performance of the friction shock absorber.

The operating principle of the friction shock absorber is based on the fact that return-and-retaining device 8 is compressed, when external force Q (FIG. 3) is applied to pressure wedge 6 at the side of the automatic coupling device when the cars collide.

Pressure wedge 6 brings stay wedges 7 inside housing 1 with the friction surfaces fp rubbing along the inner surfaces fv of walls 4 of orifice 3 in the working beds V1, as well as along the linked contact surfaces fк of contact between stay wedges 7 and pressure wedge 6. The impact energy, caused by an external force Q, is intensively absorbed and dissipated in the form of heat.

When the friction shock absorber is no longer exposed to the external force Q, return-and-retaining device 8 is released, pushing friction assembly 5 in its initial position (FIG. 2) until pressure wedge 6 is stopped by hooks 11 on housing 1 in the zone of the connecting beds V2.

REFERENCES

Patent U.S. Pat. No. 6,478,173, IPC B61G9/10; B61G11/14; B61G9/18; B61G9/06, priority date Feb. 13, 2001, publication date Nov. 11, 2002/prior art/.

LIST of reference designations and elements to which they refer

| Item No. | ELEMENT |
|---|---|
| 1 | housing |
| 2 | bottom of housing 1 |
| 3 | orifice of housing 1 |
| 4 | wall of housing 1 |
| 5 | friction assembly |
| 6 | pressure wedge |
| 7 | stay wedge |
| 8 | return-and-retaining device |
| 9 | supporting plate |
| 10 | hard lubricant insert |
| 11 | hitch |
| V1 | working bed |
| V2 | connecting bed |
| Q | external force |
| F | gravity forces |
| O | main axis |
| fp | friction surface of stay wedge 7 |
| fк | linked contact surfaces of pressure wedge 6 and stay wedges 7 |
| fv | internal surfaces of walls 4 |
| a | thickness of wall 4 at working bed V1 |
| b | thickness of wall 4 at connecting bed V2 |
| S1 | contact area of stay wedges 7 in working beds V1 |
| S2 | contact area of stay wedges 7 in connecting beds V2 |
| A-A | designation of the integrated frontal section per FIG. 1 |
| Θ1 | angle between the internal surfaces fv, which form working beds V1 |
| Θ2 | angle between the internal surfaces fv, which form connecting beds V2 |
| B, C | views per FIG. 6 |

The invention claimed is:

1. Friction shock absorber comprises housing (1) with bottom (2) and with orifice (3) formed by walls (4), internal surfaces (fv) whereof form alternating working beds (V1) and connecting beds (V2), and further comprises friction assembly (5) consisting of pressure wedge (6) and stay wedges (7) in contact with same, said stay wedges (7) being provided with friction surfaces (fp), adjacent to the internal surfaces (fv) of walls (4) of orifice (3), while return-and-retaining device (8) is located between bottom (2) and friction assembly (5), wherein the area (S1) of contact between friction surfaces (fp) of stay wedges (7) and internal surfaces (fv) of walls (4) of orifice (3) in working beds (V1) exceeds the corresponding area (S2) of contact in the connecting beds (V2), wherein thickness of walls (4) of the orifice (3) is variable with an increase in the direction from the working bed (V1) to the connecting bed (V2).

2. Friction shock absorber according to claim 1, wherein the internal surfaces (fv) of walls (4), which form working beds (V1) and connecting beds (V1), are straight and form angles (θ1, θ2) between each other.

3. Friction shock absorber according to claim 2, wherein the values of angles (θ1) between adjacent internal surfaces (fv), which form working beds (V1), are lower than the values of angles (θ2) between adjacent internal surfaces (fv), which form the connecting beds (V2).

4. Friction shock absorber according to claim 1, wherein return-and-retaining device (8) is provided with supporting plate (9) in contact with stay wedges (7).

5. Friction shock absorber according to claim 1, wherein hard lubricant inserts (10) are available between stay wedges (7) and walls (4) of orifice (3).

6. Friction shock absorber according to claim 1, wherein hitches (11) are provided in the walls (4) of orifice (5) on connecting beds (V2).

7. Friction shock absorber according to claim 1, wherein said contact between pressure wedge (6) and stay wedges (7) is provided along linked curved surfaces (fκ).

\* \* \* \* \*